N. DRAKE.
Corn Sheller.

No. 27,705. Patented April 3, 1860.

Witnesses.
R. J. Shiner
W. H. Armstrong

Inventor.
N. Drake

UNITED STATES PATENT OFFICE.

NATHANIEL DRAKE, OF NEWTON, NEW JERSEY.

CORN-SHELLER.

Specification forming part of Letters Patent No. 27,705, dated April 3, 1860; Reissued June 12, 1860, No. 980.

*To all whom it may concern:*

Be it known that I, NATHANIEL DRAKE, of Newton, in the county of Sussex and State of New Jersey, have invented a new and useful Improvement in Corn-Shellers; and I do hereby declare that the following is a full, clear, and exact description of the same, reference being had to the annexed drawings, making a part of this specification, in which—

Figure 1:
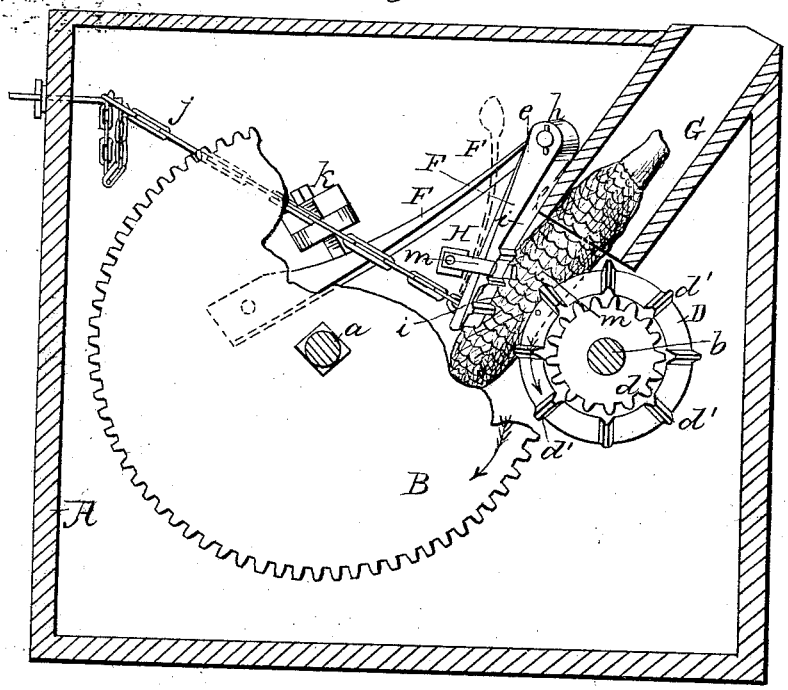
Figure 2:
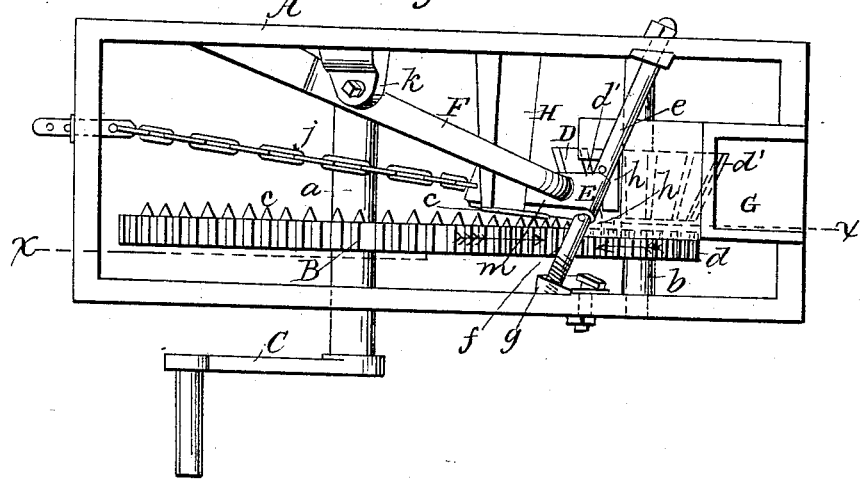

Figure 1, is a vertical section of a corn sheller with my improvement applied to it, $x$, $x$, Fig. 2, showing the plane of section. Fig. 2, is a plan or top view of the same.

Similar letters of reference indicate corresponding parts in the two figures.

To enable those skilled in the art to fully understand and construct my invention I will proceed to describe it.

A, represents a rectangular box or case in which two shafts $a$, $b$, are placed transversely. On the shaft $a$, and within the case A, a toothed wheel B, is placed, said wheel having teeth on its periphery and armed with horizontal teeth or spikes $c$, on one side. One end of the shaft $a$, projects through the side of the case A, and has a crank C, on its end, see Fig. 2. The wheel B, gears into a pinion $d$, on the shaft $b$, and on this shaft $b$, a wheel D, is placed, said wheel having an inclined periphery provided with transverse ribs $d'$. The smaller side of the wheel D, is toward the wheel B, or toward the plane of its rotation. In the upper part of the case A, a shaft $e$, is placed obliquely, said shaft having a screw $f$, at one end, which screw fits in a nut $g$, at one side of the case as shown clearly in Fig. 2, to permit of any necessary longitudinal adjustment of said shaft. On this shaft $e$, the pressure plate on bar E, is hung or suspended, the shaft passing loosely through the upper end of said plate or bar and prevented from sliding laterally thereon by pins $h$, $h$, as shown clearly in Fig. 2. This bar has transverse and concave ribs $i$, formed on its inner surface and at its lower part, and to the lower part of the plate or bar a chain $j$, is attached, said chain being connected to one end of the case A.

F, is a spring the lower end of which is secured in the case A, in any proper manner. The upper end of this spring bears on the upper part of the plate or bar E, as shown clearly in both figures, and a set screw $k$, which passes through a nut $l$, attached to the case A, bears on the spring F, and regulates its pressure.

G, is an inclined trough or spout which is placed on the case A, and in line with the space between the plate or bar E, and the wheels B, D. The plate or bar E, works between guides $m$, $m$, attached to a horizontal bar H.

The operation is as follows: Motion is given the shaft $a$, in any proper way, and the two wheels B, D, rotate in the direction indicated by the arrows. The ears of corn, shown in red, are fed down the spout G, and pass between the plate or bar E, and wheels B, D, the plate or bar E, keeping the ears of corn pressed against the wheels as they are operated on by the wheels, and insuring the perfect shelling of the corn from the cob. The plate or bar E, in consequence of the spring F, bearing against it, is allowed to yield or give to compensate for the various sized ears, and it will be seen that the plate or bar E, will yield or give under an equal pressure at all points of its movement owing to the manner in which the spring F, is made to bear upon it, for when the plate or bar E, is forced outward the upper end of the spring F, approaches nearer the shaft $e$, or fulcrum of the plate or bar E, and consequently the plate or bar has an increased leverage power as it yields to the ears while being shelled, and this increased leverage power increases correspondently with the increased resistance of the spring F. Thus it will be seen that the plate or bar E, will bear with an equal pressure on the ears at all points of its movement, and the machine may be driven with much less power than usual, for in the machines hitherto constructed the spring of the plate or bar E, is made to bear on the lower part of the plate or bar substantially as shown by the dotted lines F', in Fig. 1, and by that arrangement the resisting power of the spring increases as the plate or bar E, is forced outward, and much greater power is required to operate the machine than by my arrangement. The chain

*j*, prevents the lower part of the plate or bar E, being thrown by spring F, in contact with the wheels B, D.

I do not broadly claim the shelling wheels and pressure plate; but

Having described my invention I claim and desire to secure by Letters Patent,

The arrangement and combination of the oblique-acting adjustable spring F, set screw (*k*) plate E, and adjustable guard chain (*j*), as and for the purpose herein shown and described.

N. DRAKE.

Witnesses:
R. T. SHINER,
W. A. ARMSTRONG.